Dec. 25, 1956     E. RAWSON ET AL     2,775,224
ADJUSTABLE BIASED CLAW SUPPORT
Filed July 24, 1952     3 Sheets-Sheet 2
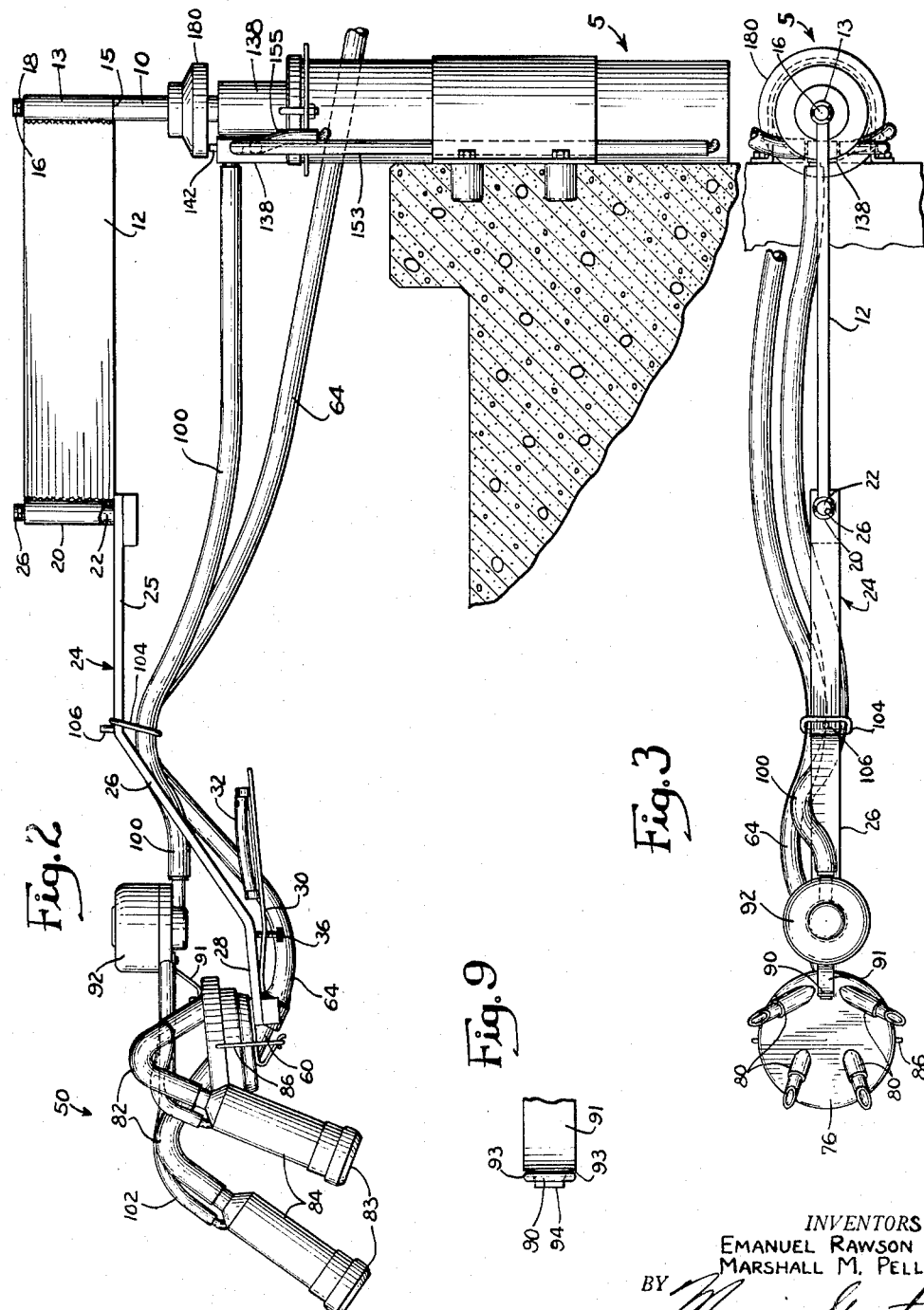
INVENTORS
EMANUEL RAWSON
MARSHALL M. PELLAR
BY Morris Spector
Atty.

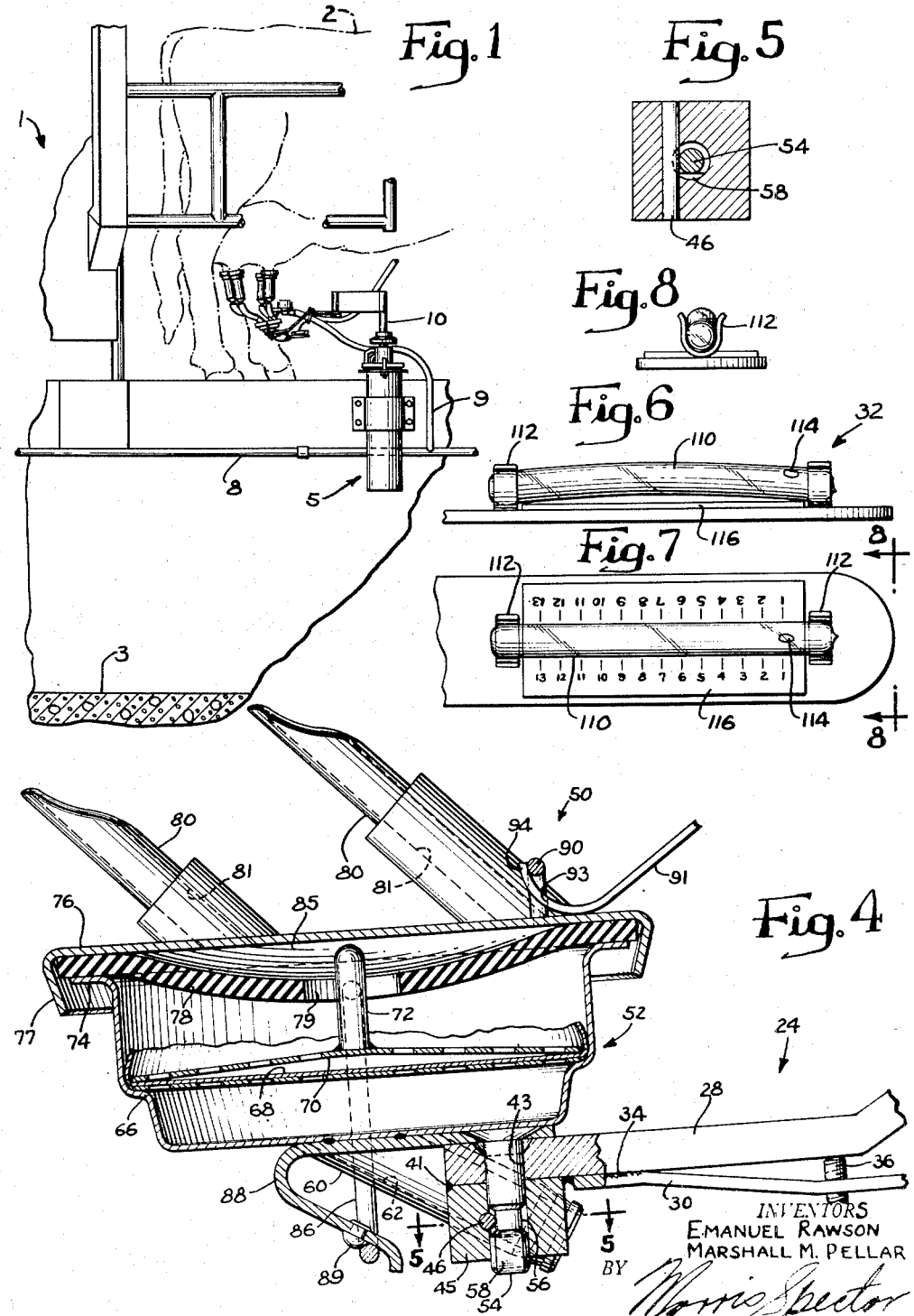

Dec. 25, 1956  E. RAWSON ET AL  2,775,224
ADJUSTABLE BIASED CLAW SUPPORT
Filed July 24, 1952  3 Sheets-Sheet 3
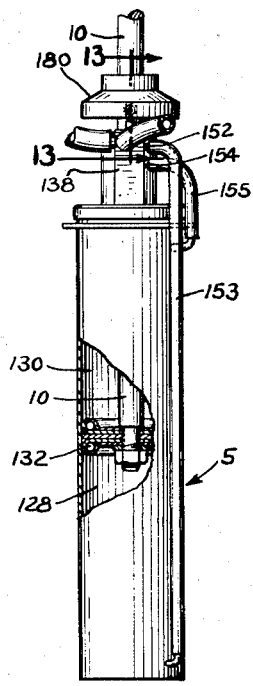
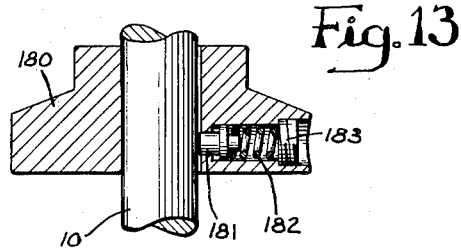
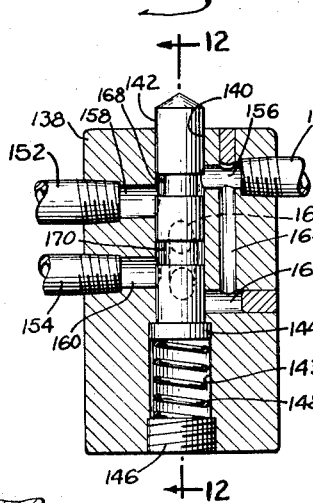
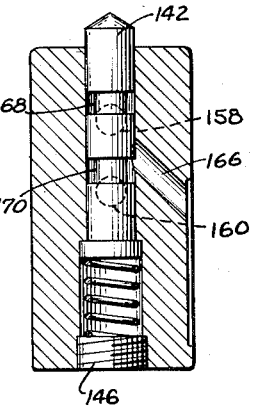
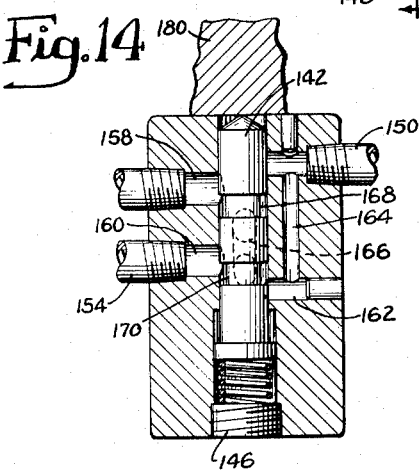
*INVENTORS*
*EMANUEL RAWSON*
*MARSHALL M. PELLAR*
BY
*Morris Spector*
*Atty.*

United States Patent Office 2,775,224
Patented Dec. 25, 1956

2,775,224

ADJUSTABLE BIASED CLAW SUPPORT

Emanuel Rawson and Marshall M. Pellar, Chicago, Ill., assignors, by mesne assignments, to Package Machinery Company, a corporation of Massachusetts Application July 24, 1952, Serial No. 300,682

3 Claims. (Cl. 119—14.13)

This invention relates to means for milking animals.

It is one of the objects of the present invention to provide a milking apparatus and a support therefor so arranged that the support is spring tensioned and will cause the teat cups to exert the requisite pull on the teats at the commencement of milking and a diminishing pull as the milking progresses.

It is an object of the present invention to provide a milker of the pneumatic type which is faster in its operation and which milks out each cow completely, or as nearly as completely as possible, so that no stripping of the cow is necessary.

At the beginning of milking operations the milk in the lower section of the cow's udder exerts pressure on each teat. That is the reason why frequently the cow's teats are dripping milk as the cow enters the dairy barn. The pressure of the milk in the lower section of the udder expands the teats and creates a better holding surface for the inflations. It is for this reason that at the commencement of milking there is very little likelihood of the teat cup dropping from the teat. Towards the end of the milking the milk in the teat has less pressure exerted on it. The teat therefore tends to shrink. This reduces the ability of the inflation to grip the teat.

A cow's teat has two limiting orifices, one at the top of the teat proper and the other at the tip of the teat. It is essential to prevent the milking inflations from climbing up the teats because by so doing they tend to create restriction of the orifice located at the top of the teat proper. By preventing total or partial constriction the cow is milked out rapidly and completely. As the cow is milked out the udder drops.

By exerting a comparatively large pull on the teat at the commencement of milking operations there is a reduction or avoidance of restriction of the top orifice of the teat proper. This increases the rapidity of milk flow at the commencement of milking operations. As the milking progresses and the teat becomes less full and less able to hold the inflations, it is proposed to reduce the pull of the inflation on the teat, thereby preventing the inflation from falling off. It is therefore an object of the present invention to provide a method of pneumatic milking whereby the pull on the teats is a maximum at the commencement of milking and is progressively reduced to a minimum as the milking approaches completion, the reduction in pull being in a measure proportionate to the drop of the teats during milking.

In the pneumatic milking of cows the required maximum starting pull differs for different cows, but for any one cow it should be the same at each milking if a maximum milking output is to be obtained. It is only by proceeding the same way day after day that maximum output is obtained from a cow. The drop of the cow's udder or of the cow's teats as milking progresses is only of the order of one-fourth inch to one-half inch. In accordance with the principles of the present invention this drop results in a change in pull from a maximum of the order of thirty pounds to a minimum of the order of five pounds. The dairyman in placing the milker in operation on a cow must know what the pull is because if the pull is too great for that cow the inflation will drop, and if the pull is too small there will be a loss in output or in speed of milking, or both. It is one of the objects of the present invention to provide a milker with means for showing the amount of pull being exerted on the cow's teat. It is a further object of the present invention to provide a milker with a gauge which not only shows the pull but amplifies the movement, so that a very small movement of the cow's teat and a corresponding movement of a pull applying spring can produce a much greater movement of the gauge indicator. During the milking operation a spring maintains the required pull on the cow's teat, said spring oscillating sufficiently to permit the inflation to move back and forth an amount of the order of one-eighth of an inch. This allows sufficient agitation or massaging of the cow's udder to produce efficient milking action.

It is a further object of the present invention to provide a manifolding arrangement for delivering the streams of milk from each of the four teats of a cow into one chamber where it flows through a filter to the milk delivery outlet of the milker. This chamber, in one preferred embodiment of the present invention, comprises a small, cup-like receptacle having a lid with a number of nipples projecting therefrom, each of which is adapted to receive the milk line of an inflation. The lid, therefore, constitutes a milking claw. The lid is clamped to the receptacle with a gasket interposed. The gasket is constructed to act as a baffle against which milk streams from the nipples impinge, so that the baffle breaks the velocity of the milk stream. The milk then drips to a paper filter located below the baffle. The baffle thereby prevents damaging of the cloth filter disc which might otherwise be torn by the impinging streams of milk from the nipples.

It is a further object of the present invention to provide a milking arrangement so constructed as to allow shutting off of one or even two of the teat cups by laying them across the top of the lid. Heretofore, when only two or three teat cups are used the unused teat cup would have to be left dangling in order to produce the necessary vacuum shut off. When this was done the dangling teat cup definitely limited the amount of permissible descent of the milking apparatus, since that teat cup had to be kept off of the floor. By the present arrangement a shut off is effected when a teat cup is placed across the lid so that a teat cup that is not being used does not have to hang from the apparatus in order to effect a shut off. Therefore, the apparatus can be operated at a lower level.

It is a still further object of the present invention to provide an improved pneumatic means for raising and lowering the milking apparatus support to any desired elevation, as may be required by a specific cow being milked, with assurance that the pneumatic apparatus will be held in its adjusted position as the milking progresses. In accordance with one embodiment of the present invention the elevating mechanism is pneumatic motor operated. This comprises a double acting air cylinder with a piston therein the position of which is controlled by a simple valve which enables movement of the air cylinder piston to any desired position and holds it in that desired position for any period of time. The valve is one which is movable in either direction from a neutral position to cause an appropriate movement of the piston. In the neutral position it holds the air cylinder piston stationary. When the valve is moved in one direction from its neutral position it causes continuous movement of the air cylinder plunger in one direction, whereas when the valve is moved in the opposite direction from its neutral position it causes continuous movement of the plunger in the reverse direction. It is a still further object of the present invention to provide a simple control arrangement for automatically restoring the motor valve to its neutral position when the operator ceases to hold the valve in either of its two alternate operative positions.

The attainment of the above and further objects of the present invention will be apparent from the following specification taken in conjunction with the accompanying drawings forming a part thereof.

In the drawings:

Figure 1 is a fragmentary side elevational view of a portion of a milking parlor embodying apparatus of the present invention;

Figure 2 is an enlarged side elevational view of the apparatus of Figure 1;

Figure 3 is a top plan view of Figure 2;

Figure 4 is an enlarged longitudinal sectional view through the milk receiver of the present invention and showing the support therefor;

Figure 5 is a fragmentary sectional view taken along the line 5—5 of Figure 4;

Figure 6 is an enlarged side elevational view of the teat cup tension gauge of the present apparatus;

Figure 7 is a top plan view of the gauge of Figure 6;

Figure 8 is an end view taken along the line 8—8 of Figure 7;

Figure 9 is a fragmentary plan view of the pulsator support;

Figure 10 is a view, in partial section, of a pneumatic mechanism for raising and lowering the milking apparatus;

Figure 11 is an enlarged longitudinal sectional view through the control valve of the pneumatic mechanism of Figure 10;

Figure 12 is a longitudinal sectional view taken along the line 12—12 of Figure 11;

Figure 13 is an enlarged sectional view taken along the line 13—13 of Figure 10; and Figure 14 is a view corresponding to Figure 12 and showing the valve in an alternate position.

Reference may now be had more particularly to the drawings wherein like reference numerals designate like parts throughout.

There is shown at 1 a cow stall in a conventional dairy barn to which the present invention has been applied. The position of a cow 2 in the milking stall is above the floor 3 of the diary barn so that the milking operation is at a level convenient to an operator standing on the floor 3. A pneumatic servo-mechanism 5 is mounted in any convenient manner adjacent to the cow stall, the mechanism being vacuum operated in a manner to be more fully set forth as this description proceeds. It is sufficient here to state that the servo-mechanism is connected to a vacuum line 8 by means of a pipe 9 and is mounted in a vertical position and includes a vertically movable piston rod 10 that is raised or lowered by the mechanism to any desired position within the limits of operation of the mechanism. The mechanism 5 operates to maintain the piston rod at its set position regardless of variations of the external push or pull on the piston rod 10 during milking.

A plate-like arm 12 is journalled on and is supported by the piston rod 10. For this purpose the arm has a tubular sleeve 13 welded thereto as by a line of weld, said tube resting on a shoulder 15 of the piston rod 10 which piston has a reduced diameter portion 16 that extends through the tube 13. The arm 12 is thus journalled on the piston rod 10, the arm 12 extending therefrom in a horizontal direction. A cotter pin 18 may be passed through a hole at the top of the piston rod 10 for retaining the arm. Another tubular sleeve 20 is welded to the opposite end of the arm 12. The tubular sleeve 20 is parallel to the sleeve 13. The sleeve 20 receives a pin 22 that is welded to a flat cantilever leaf spring arm 24. The pin 22 is journalled in the sleeve 20 and is held against downward removal by a cross pin 26 extending through a hole at the top of the pin 22 and resting on the top of the tubular sleeve 20. The spring 24 is thus journalled for rotation about two parallel vertical axes which constitute the axes of the tubular sleeves 13 and 20.

The spring arm 24 has a top substantially horizontal portion 25 which is bent to form a downwardly sloping portion 26 and then a substantially horizontal but slightly inclined portion 28, all of which constitutes a continuous cantilever leaf spring. A spring bar 30 for supporting a gauge 32, of which more will be said as this description proceeds, is welded to the portion 28 of the arm 24 as by a line of weld 34 (Fig. 4). A set screw 36 is threaded through the spring bar 30 and bears against the portion 28 for varying the angle between the spring bar 30 and the spring arm 24. A block 45 is welded to the under side of the portion 28 as by a line of weld 41 and thereafter a pin-receiving bore 43 is drilled through the end of the portion 28 and the block 45. Thereafter, a cross bore is formed in the block 45 into which a holding pin 46 is pressed.

Pneumatic milking apparatus 50 is mounted on the portion 28 of the spring 24. The pneumatic milking apparatus comprises a collector cup or receptacle 52 (Fig. 4) that has a mounting pin 54 welded thereto which pin has a peripheral groove 56 formed therein and a slabbed off lower portion 58. The pin 54 is inserted into the hole 43 with the slabbed off part 58 facing the holding pin 46, so that the pin 54 can pass the holding pin 46 to bring the peripheral groove 56 opposite the holding pin 46. Thereafter the collector cup 52 is turned through an angle of 90° to bring it to its proper position, in which position the lower shoulder of the groove 56 underlies the pin 46 and prevents direct vertical withdrawal of the pneumatic milking apparatus from the spring arm 24. The collector cup 52 of the pneumatic milking apparatus is of a generally circular cup shape and has a milk outlet nipple 60 secured to the bottom thereof. The milk outlet nipple has an internal bore 62 that opens to the bottom of the collector cup 52 so that the milk can flow from the receptacle and through the nipple. The nipple 60 is adapted to receive a flexible milk hose 64 (Fig. 2) into which the milk flows from the collector cup 52 and through the nipple. The hose has vacuum constantly applied thereto thereby placing the collector cup 52 and all parts opening thereto under vacuum.

The milk collector or cup-shaped receptacle 52 has an internal circular shoulder 66 that is adapted to receive a filter cloth 68 which is held in place by a thin, perforated, circular metal plate 70 that rests on the filter cloth 68 and the shoulder 66. The plate 70 has a central rod 72 welded or otherwise secured thereto for facilitating insertion and removal of the plate, with the filter sheet around it, into and from the collector cup 52.

At its top the collector cup or receptacle 52 has an outwardly extending peripheral flange 74 on which there rests a closure for the receptacle. The closure comprises a circular metal cover 76 having a downwardly and inwardly tapered circumferential flange 77. A circular disc 78 of rubber or the like is positioned in the cover 76. The disc 78 is a combination gasket and baffle, having a central opening 79. The disc 78 is of a diameter slightly greater than the diameter of the cover 76, so that it flexes or bows from the center of the cover 76 to form a concave upper surface spaced from the lower surface of the cover 76. The inward taper of the flange 77 serves to hold the gasket 78 in place when the cover is being positioned on the cup-shaped receptacle. The cover 76 has four milk line receiving nipples 80 secured thereto and extending upwardly therefrom, each of said nipples having a longitudinal bore 81 therethrough that opens through the cover. Each of the nipples is adapted to receive the end of a short rubber milk flow hose 82 (Fig.

2) which is part of a conventional inflation 83 that extends through a conventional teat cup 84. During the milking process milk flows from a cow's teat, through the hose 82 and corresponding nipple 80, through the cover 76 and into the space 85 between the cover and the baffle 78. The streams of milk from the respective nipples impinge upon the baffle 78 and then flow thereon to the center thereof and drip through the center 79 onto the disc 70, from which the milk then passes through the filter cloth 68 to the bottom of the cup 52 and then through the nipple 60 to the milk line 64.

A spring wire bail 86 is pivoted to the flange 77 of the cover 76 below the flange 74 at two points spaced 180° apart and is swingable to a position below the receptacle 52 into engagement with a V-shaped flat holding spring 88 and is then sprung over a holding rivet 89 in the spring 88 to resiliently and releasably lock the cover 76 to a receptacle 52.

The cover 76 also has a U-shaped hook 90 at the top thereof for receiving an arm 91 that is secured to the bottom of a pulsator 92. The pulsator is supported from the cover 76 by the arm 91, said arm resting on the cover 76 and bearing against sides 93 of the hook 90 and having a cooperating hook portion 94 embracing the under side of the top of the hook 90 for releasably holding the arm 91 in place.

The pulsator 92 may be of any preferred construction such as shown, for instance, in the pending application of Emanuel Rawson, Serial No. 111,934, filed August 23, 1949, now matured into Patent No. 2,693,703, to which reference may be had. It is sufficient here to state that the pulsator is connected by a rubber hose 100 to a source of vacuum and is connected by separate rubber hoses 102 to the shells of each of the four teat cups 84 and applies vacuum and atmospheric pressure alternately to each of the lines 102. The vacuum hoses 64 and 100 are held in neat arrangement by an oval ring 104 that loosely embraces the spring 24 and is held against sliding movement by a short pin 106 that is secured to and projects upwardly from the spring arm 24.

The sight gauge 32 previously described comprises a leveling tube 110 mounted on the spring bar 30 in any desired manner, as by a pair of spring clips 112. The longitudinal axis of the tube 110 lies in a vertical plane and is slightly arched upwardly. The tube is filled with a suitable liquid, preferably a colored liquid, and has therein an air bubble 114 that naturally rises to the topmost part of the tube. Any tilting of the spring bar 30 will cause a corresponding movement of the air bubble 114. A calibrated scale 116 may be provided for indicating the upward pull of the inflations on the spring 24 or, conversely, the downward pull of the spring 24 on the inflations, as determined by the position of the air bubble 114.

Reference may now be had more particularly to Figures 10 through 14 which show the pneumatic servo-motor for raising and lowering the milking apparatus. The servo-motor 5 includes a double acting pneumatic cylinder that is mounted in the dairy barn and includes a lower cylinder chamber 128 and an upper cylinder chamber 130 within which there is a movable piston 132 to which the post or piston rod 10 is connected, said post or piston rod extending through suitable sealing gasketing means in an upper cylinder head. The position of the piston in the cylinder bores 128—130 determines the height of the arm 12. A valve 138 is mounted on the upper cylinder head for controlling the application of vacuum or pressure to one or the other of the two cylinder bores 128—130 to raise or lower the piston 132. The valve 138 includes a central bore 140 for receiving a valve plunger 142, the bore 140 being in alignment with and a continuation of an enlarged counter-bore 143 in which is slidable a head 144 of the valve plunger 142 and which constitutes a stop limiting the upward movement of the valve plunger. A threaded screw 146 threads into and closes the counter-bore 143 and supports a spring 148 that normally urges the valve plunger 142 to its uppermost position. The valve has a nipple 150 for connection to a source of vacuum and nipples 152 and 154 that are connected by suitable hose 153 and 155, respectively, to the lower and upper cylinder bores 128 and 130, respectively. The nipples 150, 152 and 154 connect to ports 156, 158 and 160, respectively, all of which lead to and open into the central bore 140. In addition, the valve 138 has a port 162 communicating with the port 156 as by a cross bore 164, and also opening into the central bore 140. In addition, there is a port 166 leading from the atmosphere to the central bore 140, the port 166 opening into the bore 140 about midway between the openings of the ports 158 and 160 at the bore 140. The valve plunger 142 is a solid circular rod having peripheral grooves 168 and 170. When the valve plunger 142 is depressed to its lowermost position (illustrated in Fig. 14) it establishes communication with the vacuum line 150, through the port 156 and the passageway 164 which is then in communication with the groove 170 in the valve plunger, which groove is then also in communication with the bore 160. This applies vacuum through the line 155 to the upper cylinder 130. At the same time atmospheric pressure is applied from the port 166 which is now in communication with the groove 168 that is also in communication with the port 158. The application of atmospheric pressure through the line 153 to the cylinder 128 and the simultaneous application of vacuum through the line 155 to the cylinder 130 causes the valve piston 132 to rise, thereby raising the piston rod 10. This continues as long as the valve plunger 142 is maintained depressed, namely, in the position illustrated in Figure 14. If the valve plunger 142 is permitted to rise to its uppermost position, namely, that illustrated in Figure 11, the atmospheric and vacuum connections to 153 and 155 are reversed, the vacuum being applied by way of the lines 150 and port 156 to the plunger groove 168, thence to the port 158 which extends the vacuum to the cylinder bore 128, while atmospheric pressure is being applied by way of the bore 166, valve plunger groove 170, bore 160, and nipple 154 that connects to the cylinder bore 130, so that as long as the valve plunger is in its uppermost position the piston 132 and its associated post or piston rod 10 are continuously being lowered by the continuous application of atmospheric pressure above the piston 132 and vacuum below the piston 132. When the valve plunger is in an intermediate position, somewhat in between its lowermost position of Figure 14 and its uppermost position of Figure 11, it closes off the vacuum connections at the ports 156 and 162 and also closes off the atmospheric air port 166 at the bore 140. Under such conditions the air that is within the cylinders 128 and 130 remains trapped in the respective cylinders, and the piston 132 therefore remains pneumatically locked in whatever position it happens to be.

Means is provided for depressing the valve plunger to its lowermost position to effect raising of the equipment, or for permitting the valve plunger to rise to its uppermost position under the action of the spring 148 to effect lowering of the equipment. This means comprises a collar 180 loosely mounted on the piston rod 10 on the outside of the cylinders and freely slidable thereon but frictionally held in position by a spring pressed plug 181 that is in frictional engagement with the piston rod 10, being pressed thereagainst by a spring 182 that seats on a screw 183. If it is desired to raise the equipment the operator forcibly slides the collar 180 downwardly on the piston rod 10 until the collar presses the valve plunger 142 downwardly to its lowermost position, as illustrated in Figure 14. The pneumatic mechanism thereupon causes the piston rod 10 to rise. As long as the operator holds the collar 180 down the piston rod 10 continues to rise, the piston rod sliding in frictional engagement with the plug 181. When the proper elevation has been reached the operator releases the collar 180. The plug 181 in gripping the upwardly rising piston rod causes the collar 180 to rise with the piston rod, thereby permitting the valve plunger 142 also to rise from the position illustrated in Figure 14. When the valve plunger rises to a position half way between the position illustrated in Figure 14 and that illustrated in Figure 10 it shuts off the servo-motor and further rise of the equipment is halted. The equipment then remains in the position to which it has been elevated. If it is desired subsequently to elevate the equipment further it is merely necessary again to depress the collar 150, thereby again depressing the valve plunger 142 to continue the pneumatic lifting of the piston 31'.

If it is desired to lower the piston 31' it is merely necessary to slide the collar 180 slightly upwardly on the piston rod. This permits the valve plunger 142 to rise to the position illustrated in Figure 11, under the action of the spring 148, and start the lowering action of the piston rod 10, as heretofore explained. This continues as long as the operator maintains the collar 180 raised above the valve plunger 142. When the operator desires to stop further lowering of the piston rod he merely releases the collar so that the collar plug 181 now moves with the descending piston rod 10 and pushes the valve plunger 142 downwardly until it reaches its locking position, that is, a position intermediate that of Figure 11 and that of Figure 14, at which time again the valve and air connections through the lines 153 and 155 are closed, so that again the piston is pneumatically locked in position and the piston rod remains in the position to which it has been moved.

The servo-motor mechanism operates automatically to maintain the piston 132 and therefore the piston rod 10 in a fixed elevation determined by the position of the collar 180 on the piston rod 10. So long as the collar is not being shifted manually on the piston rod the mechanism serves to maintain the collar 180 in such a position that the collar maintains the valve plunger 142 in its locking position, that is, in its position intermediate the piston raising position of Figure 14 and the piston lowering position of Figure 11. If the external load on the piston rod 10 changes, that change can produce only a momentary raising or lowering of the pneumatically balanced piston 132 and the piston rod 10. Any momentary lowering of the piston rod due to a shift in load immediately depresses the valve plunger 142 to cause the servo-motor mechanism to raise the piston rod, which raising continues until the valve plunger reaches its intermediate or locking position above referred to. On the other hand, any change in the external load on the piston rod 10 which tends to cause the piston rod to rise momentarily will immediately permit the valve plunger 142 to rise, thereby causing the servo-motor mechanism 5 to operate to lower the piston rod, this lowering continuing until the collar 180 on the piston rod again brings the valve plunger 142 to its intermediate position above referred to.

An explanation will now be given of the manner of operation of the equipment thus far described. The operator connects the apparatus to a source of vacuum and then swings the arm 24 to position beneath the udder of the cow and raises the teat cups 84 and places them on the udder of the cow. He then operates the servo-motor mechanism to raise or lower the arm 12 as may be required to bring the collector equipment 50 to a proper elevation with respect to the cow's teats, so that the apparatus exerts the necessary pull on the cow's teats. The magnitude of the pull is ascertained by noting the position of the bubble 114 in the gauge glass 110. When the operator obtains the required initial tension for proper milking of the particular cow that is being milked he releases the collar 180, thus leaving the piston 10 and therefore the arm 24 in its adjusted vertical position for maintaining the requisite initial pull on the cow's teats. As the milking progresses and the amount of milk remaining in the cow's udder diminishes, the cow's teats tend to drop slightly. This drop permits a corresponding lowering of the milk collector cup 52 under the tension to which it is subjected by the spring arm 24 so that the pull on the teats is progressively diminished as the teats drop. During this action the arm 12 remains in the particular vertical position to which it had been initially adjusted by the servo-motor mechanism. The spring arm 24 is of such tension that a drop of the teats of the order of a half inch changes the pull on the teats from a pull of the order of thirty pounds to a pull of the order of five pounds. This, it has been found, is ideal for rapid, complete milking. The oscillation of the spring arm 24 during milking is sufficient to produce the desired massaging effect that is conducive to complete milking.

In compliance with the requirements of the patent statutes we have here shown and described a preferred embodiment of our invention. It is, however, to be understood that the invention is not limited to the precise construction here shown, the same being merely illustrative of the principles of the invention. What we consider new and desire to secure by Letters Patent is:

1. Apparatus of the character described for supporting milking equipment below the udder of a cow, comprising a support, means operatively associated with said support for adjusting the position of the support vertically, a cantilever spring carried by the support and extending therefrom, milking equipment supported by said spring, and a gauge carried by the spring and measuring the flexure thereof.

2. Apparatus of the character described for supporting milking equipment below the udder of a cow, comprising a support, means operatively associated with said support for adjusting the position of the support vertically, a cantilever spring carried by the support and extending therefrom in a generally horizontal direction, milking equipment supported by said spring, and a guage carried by the spring and measuring the flexure thereof.

3. Apparatus of the character described for supporting milking equipment below the udder of a cow, comprising a support, means operatively associated with said support for adjusting the position of the support vertically, a cantilever spring carried by the support and extending therefrom, milking equipment supported by said spring, and a gauge carried by the spring and measuring the flexure thereof, said gauge comprising a generally horizontal transparent tube the longitudinal axis of which has a slight curvature in a vertical plane, said tube being filled with liquid except for an air bubble, and a calibrated scale for determining the magnitude of movement of the air bubble to indicate the amount of flexing of the spring.

References Cited in the file of this patent
UNITED STATES PATENTS

| | | |
|---|---|---|
| 1,316,582 | Leitch | Sept. 23, 1919 |
| 1,859,213 | McCornack | May 17, 1932 |
| 2,050,356 | McCornack | Aug. 11, 1936 |
| 2,136,228 | Babson et al. | Nov. 8, 1938 |
| 2,613,636 | Babson | Oct. 14, 1952 |
| 2,628,589 | Reeve | Feb. 17, 1953 |
| 2,683,437 | Merritt | July 13, 1954 |